US005767980A

United States Patent [19]

Wang et al.

[11] Patent Number: 5,767,980

[45] Date of Patent: Jun. 16, 1998

[54] VIDEO BASED COLOR SENSING DEVICE FOR A PRINTING PRESS CONTROL SYSTEM

[75] Inventors: Xin xin Wang, Woodridge; Robert Nemeth, Darien, both of Ill.

[73] Assignee: Goss Graphic Systems, Inc., Westmont, Ill.

[21] Appl. No.: 493,184

[22] Filed: Jun. 20, 1995

[51] Int. Cl.$^{6}$ ................................ H04N 1/40; H04N 1/46

[52] U.S. Cl. ........................... 358/298; 358/504; 358/505

[58] Field of Search .................................... 358/298, 406, 358/500, 501, 504, 505, 509–514, 518–523, 530–538; 382/162, 167, 312, 318, 319

[56] References Cited

U.S. PATENT DOCUMENTS

| | | | |
|---|---|---|---|
| 2,968,988 | 1/1961 | Fothergill | 88/14 |
| 3,376,426 | 4/1968 | Frommer et al. | 250/226 |
| 3,612,753 | 10/1971 | Korman | 178/5.2 A |
| 3,778,541 | 12/1973 | Bowker | 358/505 |
| 3,806,633 | 4/1974 | Coleman | 178/5.2 R |
| 3,958,509 | 5/1976 | Murray et al. | 101/426 |
| 4,249,217 | 2/1981 | Korte et al. | 358/294 |
| 4,308,553 | 12/1981 | Roetling | 358/75 |
| 4,393,399 | 7/1983 | Gast et al. | 358/80 |
| 4,408,231 | 10/1983 | Bushaw et al. | 358/280 |
| 4,441,206 | 4/1984 | Kuniyoshgi et al. | 382/8 |
| 4,468,692 | 8/1984 | Yamada et al. | 358/76 |
| 4,472,736 | 9/1984 | Ushio et al. | 358/75 |
| 4,476,487 | 10/1984 | Klie et al. | 358/80 |
| 4,481,532 | 11/1984 | Clark et al. | 358/80 |
| 4,482,917 | 11/1984 | Gaulke et al. | 358/80 |
| 4,486,772 | 12/1984 | Klie et al. | 358/80 |
| 4,494,875 | 1/1985 | Schramm et al. | 356/402 |
| 4,505,589 | 3/1985 | Ott et al. | 356/402 |
| 4,520,504 | 5/1985 | Walker et al. | 382/312 |
| 4,539,647 | 9/1985 | Kaneko et al. | 364/526 |
| 4,561,103 | 12/1985 | Horiguchi et al. | 382/1 |
| 4,564,859 | 1/1986 | Knop et al. | 358/75 |

(List continued on next page.)

FOREIGN PATENT DOCUMENTS

| | | |
|---|---|---|
| 0 142 470 B1 | 10/1984 | European Pat. Off. . |
| 408 507 | 7/1990 | European Pat. Off. . |
| 0 601 259 A1 | 12/1992 | European Pat. Off. . |
| 35 33 549 | 10/1986 | Germany . |
| 40 23 320 | 1/1992 | Germany . |
| 43 21 177 | 1/1995 | Germany . |
| 60-115820 | 11/1983 | Japan . |
| 2-110566 | 4/1990 | Japan . |
| 649 842 | 6/1985 | Switzerland . |
| 2 282 565 | 4/1995 | United Kingdom . |

OTHER PUBLICATIONS

Graphic Microsystems, Inc., Advertisement for Autosmart™ Software.

Graphic Microsystems, Inc. *Autosmart II Version 10.0 User's Manual*, pp. 1–2.

Heidelberg, *Technical Series. . . 2 Stop Guessing About Color.*

European search report issued in European patent application No. 96109381.2, dated Apr. 29, 1997.

*Primary Examiner*—Eric Frahm

*Attorney, Agent, or Firm*—Marshall, O'Toole, Gerstein, Murray & Borun

[57] ABSTRACT

A color sensing device of a printing press control system, having a plurality of lamp fixtures (100 and 102) for providing light in the visible region and the near infrared region of the spectrum to illuminate a viewing area (104), a camera assembly (108), the camera assembly having multiple channels to capture images in the visible region and the near infrared region, and at least one lens for generating the images, a calibration target (108) with a uniform light reflectance, a device for adjusting the distribution of the light so that image captured from said calibration target in each channel of the camera assembly is as even as possible, a device for applying a position related compensation process in order to obtain an image which corresponds to a position-invariant viewing condition, and a device for applying a camera value related compensation process in order to obtain an image under a standard viewing condition.

70 Claims, 16 Drawing Sheets

U.S. PATENT DOCUMENTS

| | | | |
|---|---|---|---|
| 4,583,186 | 4/1986 | Davis et al. | 364/526 |
| 4,590,515 | 5/1986 | Wellendorf | 358/75 |
| 4,631,578 | 12/1986 | Sasaki et al. | 358/80 |
| 4,631,579 | 12/1986 | Hoffrichter et al. | 358/80 |
| 4,636,081 | 1/1987 | Saitoh et al. | 356/402 |
| 4,643,563 | 2/1987 | Sayanagi | 355/77 |
| 4,649,500 | 3/1987 | Yamada et al. | 364/518 |
| 4,649,502 | 3/1987 | Keller et al. | 364/519 |
| 4,649,566 | 3/1987 | Tsunoda et al. | 382/1 |
| 4,666,307 | 5/1987 | Matsumoto et al. | 356/404 |
| 4,667,227 | 5/1987 | Ikeda | 358/75 |
| 4,678,336 | 7/1987 | Tsunoda | 356/380 |
| 4,681,455 | 7/1987 | Jeschke et al. | 356/445 |
| 4,685,139 | 8/1987 | Masuda et al. | 382/1 |
| 4,713,684 | 12/1987 | Kawamura et al. | 358/530 |
| 4,716,456 | 12/1987 | Hosaka | 358/75 |
| 4,731,661 | 3/1988 | Nagano | 358/75 |
| 4,752,822 | 6/1988 | Kawamura | 358/523 |
| 4,758,885 | 7/1988 | Sasaki et al. | 358/520 |
| 4,790,022 | 12/1988 | Dennis | 382/8 |
| 4,794,382 | 12/1988 | Lai et al. | 340/703 |
| 4,794,648 | 12/1988 | Ayata et al. | 382/8 |
| 4,802,107 | 1/1989 | Yamamoto et al. | 364/525 |
| 4,809,061 | 2/1989 | Suzuki | 358/75 |
| 4,830,501 | 5/1989 | Terashita | 356/402 |
| 4,837,711 | 6/1989 | Suzuki | 364/523 |
| 4,839,719 | 6/1989 | Hirota et al. | 38/75 |
| 4,839,721 | 6/1989 | Abdulwahab et al. | 358/80 |
| 4,855,765 | 8/1989 | Suzuki et al. | 346/154 |
| 4,879,594 | 11/1989 | Stansfield et al. | 358/80 |
| 4,884,130 | 11/1989 | Huntsman | 358/80 |
| 4,891,690 | 1/1990 | Hasegawa et al. | 358/75 |
| 4,899,214 | 2/1990 | Robbins et al. | 358/75 |
| 4,907,076 | 3/1990 | Ohsawa | 358/80 |
| 4,908,712 | 3/1990 | Uchiyama et al. | 358/298 |
| 4,910,593 | 3/1990 | Weil | 358/113 |
| 4,922,337 | 5/1990 | Hunt et al. | 358/101 |
| 4,926,254 | 5/1990 | Nakatsuka et al. . | |
| 4,941,038 | 7/1990 | Walowit | 358/80 |
| 4,947,348 | 8/1990 | Van Arsdel | 364/523 |
| 4,949,172 | 8/1990 | Hunt et al. | 358/101 |
| 4,949,284 | 8/1990 | Watanabe | 364/520 |
| 4,956,703 | 9/1990 | Uzuda et al. | 358/76 |
| 4,958,221 | 9/1990 | Tsuboi et al. | 358/80 |
| 4,959,790 | 9/1990 | Morgan | 364/518 |
| 4,962,421 | 10/1990 | Murai | 358/76 |
| 4,967,264 | 10/1990 | Parulski et al. | 348/271 |
| 4,967,379 | 10/1990 | Ott | 364/526 |
| 4,970,584 | 11/1990 | Sato et al. | 358/75 |
| 4,975,769 | 12/1990 | Aizu et al. | 358/80 |
| 4,975,862 | 12/1990 | Keller et al. | 364/526 |
| 4,977,448 | 12/1990 | Murata et al. | 358/75 |
| 5,003,494 | 3/1991 | Ng | 364/519 |
| 5,018,008 | 5/1991 | Asada | 358/78 |
| 5,029,107 | 7/1991 | Lee | 364/518 |
| 5,045,937 | 9/1991 | Myrick | 358/109 |
| 5,047,842 | 9/1991 | Bouman, Jr. et al. | 358/75 |
| 5,053,866 | 10/1991 | Johnson | 358/75 |
| 5,068,810 | 11/1991 | Ott | 364/526 |
| 5,081,527 | 1/1992 | Naito | 358/75 |
| 5,084,758 | 1/1992 | Danzuka et al. | 358/296 |
| 5,087,126 | 2/1992 | Pochieh | 356/402 |
| 5,089,977 | 2/1992 | Pflästerer et al. | 364/526 |
| 5,101,448 | 3/1992 | Kawachiya et al. | 382/61 |
| 5,105,466 | 4/1992 | Tsujiuchi et al. | 382/1 |
| 5,107,332 | 4/1992 | Chan | 358/80 |
| 5,120,624 | 6/1992 | Takanashi et al. | 430/47 |
| 5,121,196 | 6/1992 | Hung | 358/75 |
| 5,122,977 | 6/1992 | Pfeiffer | 364/551 |
| 5,125,037 | 6/1992 | Lehtonen et al. | 382/8 |
| 5,126,839 | 6/1992 | Sugiura | 358/80 |
| 5,128,748 | 7/1992 | Murakami et al. | 358/75 |
| 5,130,935 | 7/1992 | Takiguchi | 364/526 |
| 5,142,356 | 8/1992 | Usami et al. | 358/80 |
| 5,148,288 | 9/1992 | Hannah | 358/80 |
| 5,157,483 | 10/1992 | Shoji et al. | 358/75 |
| 5,157,506 | 10/1992 | Hannah | 358/298 |
| 5,162,899 | 11/1992 | Naka et al. | 358/80 |
| 5,163,012 | 11/1992 | Wuhrl et al. | 364/552 |
| 5,166,755 | 11/1992 | Gat | 356/419 |
| 5,166,789 | 11/1992 | Myrick | 358/109 |
| 5,170,441 | 12/1992 | Mimura et al. | 382/45 |
| 5,172,224 | 12/1992 | Collette et al. | 358/80 |
| 5,175,772 | 12/1992 | Kahn et al. | 382/1 |
| 5,181,081 | 1/1993 | Suhan | 356/394 |
| 5,181,257 | 1/1993 | Steiner et al. | 382/17 |
| 5,182,571 | 1/1993 | Creagh et al. | 346/1.1 |
| 5,182,721 | 1/1993 | Kipphan et al. | 364/526 |
| 5,191,361 | 3/1993 | Abe | 346/157 |
| 5,200,817 | 4/1993 | Birnbaum | 358/80 |
| 5,206,707 | 4/1993 | Ott | 356/402 |
| 5,216,498 | 6/1993 | Matsunawa | 358/75 |
| 5,216,504 | 6/1993 | Webb et al. | 358/139 |
| 5,224,421 | 7/1993 | Doherty | 101/211 |
| 5,272,518 | 12/1993 | Vincent | 356/405 |
| 5,282,064 | 1/1994 | Yamada | 358/487 |
| 5,282,671 | 2/1994 | Stewart et al. | 358/532 |
| 5,295,003 | 3/1994 | Lee | 358/509 |
| 5,299,034 | 3/1994 | Kanno et al. | 358/518 |
| 5,302,833 | 4/1994 | Hamar et al. | 250/561 |
| 5,303,028 | 4/1994 | Milch | 356/328 |
| 5,317,425 | 5/1994 | Spence et al. | 358/504 |
| 5,325,217 | 6/1994 | Nagler et al. | 358/506 |
| 5,329,383 | 7/1994 | Collette | 358/500 |
| 5,345,320 | 9/1994 | Hirota | 358/518 |
| 5,357,448 | 10/1994 | Stanford | 364/526 |
| 5,359,677 | 10/1994 | Katsurada et al. | 382/58 |
| 5,363,318 | 11/1994 | McCauley | 364/571.01 |
| 5,384,621 | 1/1995 | Hatch et al. | 355/204 |
| 5,386,299 | 1/1995 | Wilson et al. | 358/406 |
| 5,392,360 | 2/1995 | Weindelmayer et al. | 382/8 |
| 5,404,156 | 4/1995 | Yamada et al. | 347/115 |
| 5,404,158 | 4/1995 | Carlotta et al. | 347/32 |
| 5,412,577 | 5/1995 | Sainio et al. | 364/469 |
| 5,416,613 | 5/1995 | Rolleston et al. | 358/518 |
| 5,420,945 | 5/1995 | Concannon et al. | 382/312 |
| 5,424,553 | 6/1995 | Morton | 250/548 |
| 5,452,112 | 9/1995 | Wan et al. | 358/504 |
| 5,459,678 | 10/1995 | Feasey | 364/571.07 |
| 5,463,469 | 10/1995 | Funada et al. | 358/296 |
| 5,467,412 | 11/1995 | Capitant et al. | 382/167 |
| 5,479,189 | 12/1995 | Chesauage et al. | 345/154 |
| 5,481,380 | 1/1996 | Bestmann | 358/504 |
| 5,483,359 | 1/1996 | Yumida et al. | 358/513 |
| 5,483,360 | 1/1996 | Rolleston et al. | 358/518 |
| 5,488,492 | 1/1996 | Abe | 358/518 |
| 5,491,568 | 2/1996 | Wan | 358/518 |
| 5,493,518 | 2/1996 | Keating | 364/578 |
| 5,508,810 | 4/1996 | Sato | 358/296 |
| 5,509,086 | 4/1996 | Edgar et al. | 382/167 |
| 5,509,115 | 4/1996 | Butterfield et al. | 395/147 |
| 5,521,722 | 5/1996 | Colvill et al. | 358/500 |
| 5,528,377 | 6/1996 | Hutcheson | 358/298 |
| 5,530,239 | 6/1996 | Konishi et al. | 250/208 |
| 5,530,656 | 6/1996 | Six | 364/526 |
| 5,543,940 | 8/1996 | Sherman | 358/518 |
| 5,574,664 | 11/1996 | Feasey | 358/518 X |
| 5,604,586 | 2/1997 | Bahr et al. | 356/244 |
| 5,673,336 | 9/1997 | Edgar et al. | 382/167 |

CAMERA: SINGLE CCD
WITH BUILT IN FILTERS

FIG. 12
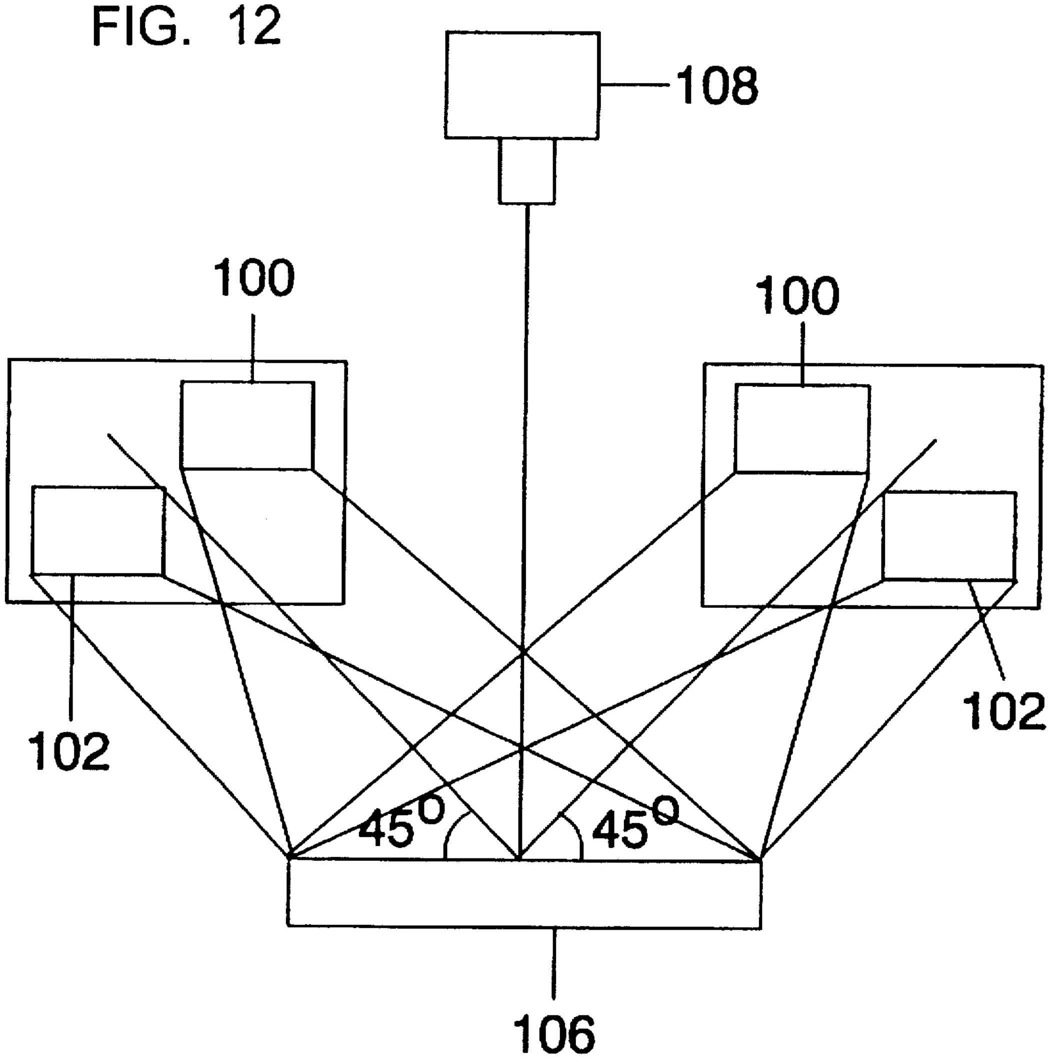
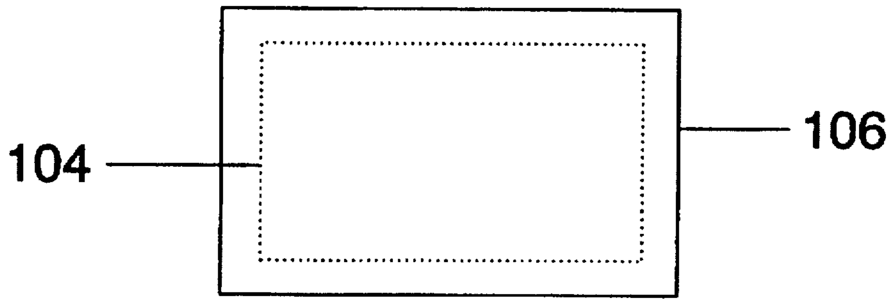
FIG. 12A

VIDEO BASED COLOR SENSING DEVICE FOR A PRINTING PRESS CONTROL SYSTEM

BACKGROUND OF THE INVENTION

The present invention relates to control systems for a printing press.

In the past, four process inks (cyan, magenta, yellow and black) have been used on a printing press to produce copies with a gamut of colors. To improve trapping and reduce ink cost, various undercolor removal techniques (UCR) and grey component replacement (GCR) techniques have been used in color separation processing. The UCR and GCR techniques remove a certain amount of the cyan, magenta and yellow ink from some printing areas and replace them with a certain amount of the black ink. Thus, the black ink has been used to generate not only the text but also the color image, thus reducing the total volume of ink used to print. Different color separation equipment manufacturers offer different UCR and GCR techniques to determine when this black ink substitution will take place and what amount of inks will be substituted.

In the past, the press room color reproduction quality control process has been divided into two categories: "control by target" and "control by image."

In the "control by target" method, a set of color control targets is printed in a margin. Instruments, such as densitometers, are used to monitor the color attributes, such as the optical density, of these targets. The printing press is then adjusted based on the measured deviation of these control targets from a predefined attribute value. The application of this method for quality control creates waste and consumes resources in that an additional process is required to cut off this target from the final product. It also requires tight material control for paper color and porosity, ink color, and other printing parameters so that the desired image color is maintained.

In the "control by image" method, the print image on a production copy is compared with the printed image on a reference copy, called a proof. The press is then adjusted based on the difference between the production image and the reference image. This system is more versatile because it does not require an additional target to be printed. The "control by image" method is also more accurate than the "control by target" method because in some situations although the measured attributes of control targets on the production and reference images are the same, the two images will look different. Conventionally, both the image comparing task and the press adjusting task are performed by a press operator. To improve the productivity and the color consistency, several automatic printing quality inspection systems have been reported recently. These systems use opto-electronic sensor devices, such as a spectrophotometer, or CCD color cameras, to measure the color reproduction quality. Currently, the bandwidth of these sensor devices is limited to the visible region of 400 nm through 700 nm in wavelength of the electromagnetic spectrum. However, within the visible region, it is not possible for these devices to reliably distinguish the black ink from the process black made by the combination of cyan, magenta, and yellow inks, or to determine whether the black ink or all cyan, magenta, and yellow inks should be adjusted. Although these devices, such as spectrophotometers, might be able to measure the printed color accurately, it is difficult to use the measured color information to achieve the automatic control for a four-color press without a target due to the involvement of the UCR and GCR techniques. A control method without targets could require selecting the points in the image to be measured or a large number of measurements would have to be acquired. A camera system can acquire a large number of measurements simultaneously, giving it an advantage when targets are not printed.

Since the quality of control can be attributed, in part, to the consistency of measurement, it becomes necessary to provide the means to ensure this consistency. In order to control the printing press accurately, there are two fundamental requirements for this camera based color sensing system. These two requirements are position-invariant and time-invariant. The position-invariant requirement ensures that consistent measurements can be obtained from a sample regardless where this sample is positioned in the camera field of view. The time-invariant requirement ensures that repeatable measurements can be obtained from a sample over a long period of time.

However, many components used in a camera measurement system are not position-invariant. For example, a lens transmits less light at its border region than it does in its center region. Normally, the relative illumination of a lens is proportional to the fourth power of the cosine of the viewing angle. This means that at a 30-degree viewing angle, the relative illumination is only 50% of that along the optical axis of the lens. At a 45-degree viewing angle, the relative illumination is further reduced to 25%. Thus, an image obtained from an uniformly illuminated area will have darker corners, especially when the viewing angle is large. Depending upon the type of glass and surface coatings used, this dark corner problem may also be wavelength related. Therefore, certain camera channels may have more dark corner problems than other camera channels. To overcome this dark corner problem, maintain a higher dynamic range and to enable a uniform target to be viewed by the camera as uniform, more light is needed in the corner regions of the camera field of view.

Many components are not time-invariant. For example, the output of a lamp may vary based on the variation of the supplied voltage and ambient temperature. The characteristics of the camera preamplifier and analog-to-digital conversion circuit may also change from time to time. The camera lens iris setting may also be changed by vibration. All of these factors decrease the system repeatability.

To achieve and maintain the position-invariant and time-invariant requirements, a standard viewing condition is needed in order to compensate these variables.

SUMMARY OF THE INVENTION

A principal feature of the present invention is the provision of an improved lighting system for a control system of a printing press.

A color sensing device for a printing press control system comprising, a plurality of lamp fixtures for providing light in the visible region and the near infrared region of the spectrum to illuminate a viewing area, a camera assembly, said camera assembly comprising multiple channels to capture images in the visible region and the near infrared region, and at least one lens for generating said image, a calibration target with a uniform light reflectance, means for adjusting the distribution of said light so that images captured from said calibration target in each channel of said camera assembly is as uniform as possible, means for applying a position related compensation process in order to obtain an image which corresponds to a position-invariant viewing condition, and means for applying a camera value related compensation process in order to obtain an image which corresponds to a standard viewing condition.

A feature of the present invention is the provision of means for providing a light compensation.

Another feature of the invention is that the device obtains an image which corresponds to a uniform lighting condition.

Thus, a feature of the invention is that the device calibrates the lighting system, and provides a perceived uniform lighting condition which provides position independent measurements for the control system of the printing press.

Further features will become more fully apparent in the following description of the embodiments of the invention, and from the appended claims.

DESCRIPTION OF THE DRAWINGS

In the drawings:

FIG. 12 is a diagrammatic view of a lighting arrangement for the control system of the printing press and FIG. 12*a* is a diagrammatic view of a calibration target positioned in the field of view of a camera device;

DESCRIPTION OF THE PREFERRED EMBODIMENTS

Figure 1:
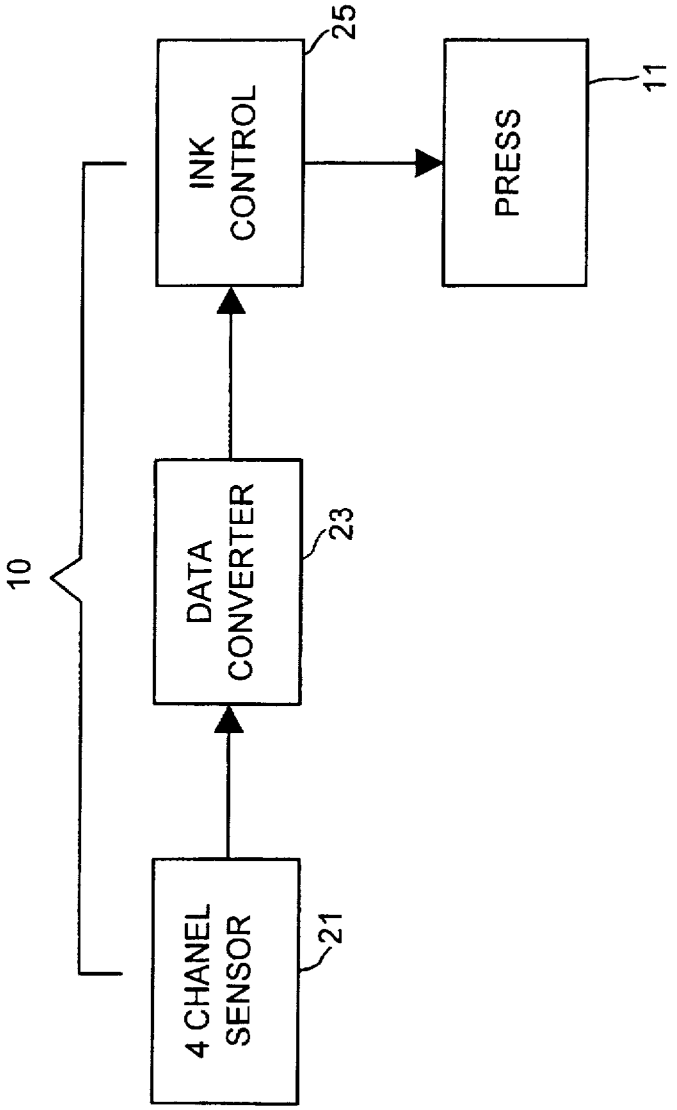
FIG. 1 is a block diagram of a control system for a printing press of the present invention.

Referring now to FIG. 1, there is shown a control system generally designated 10 for a printing press 11 of the present invention.

Figure 8:
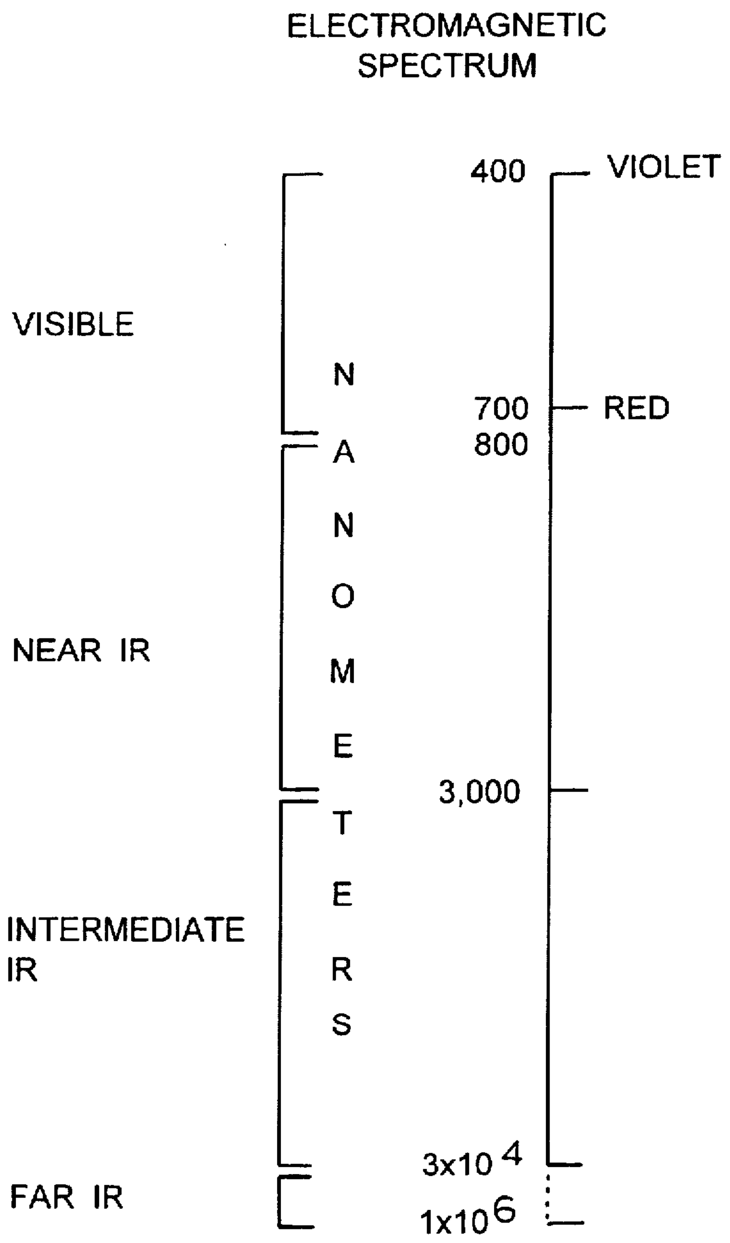
FIG. 8 is a diagrammatic view of a spectrum of electromagnetic waves including the visible spectrum and the infrared spectrum.

The control system 10 has a 4 channel sensor 21, a data converter 23 for processing information from the sensor 21, and a device 25 for controlling ink for the press 11. As will be seen below, the 4 channel sensor 21 detects the energy reflected from a paper surface, such as the paper web for the press 11, in both the visible region and the infrared region of the electromagnetic spectrum. As shown in FIG. 8, electromagnetic waves in the infrared region have a longer wave length than the visible spectrum, with the wave lengths of the electromagnetic waves in the region of visible light being approximately 400 to 700 nanometers (nm), and the wave lengths of the electromagnetic waves in the infrared region, including near infrared, being equal to or greater than 800 nm.

Figure 2:
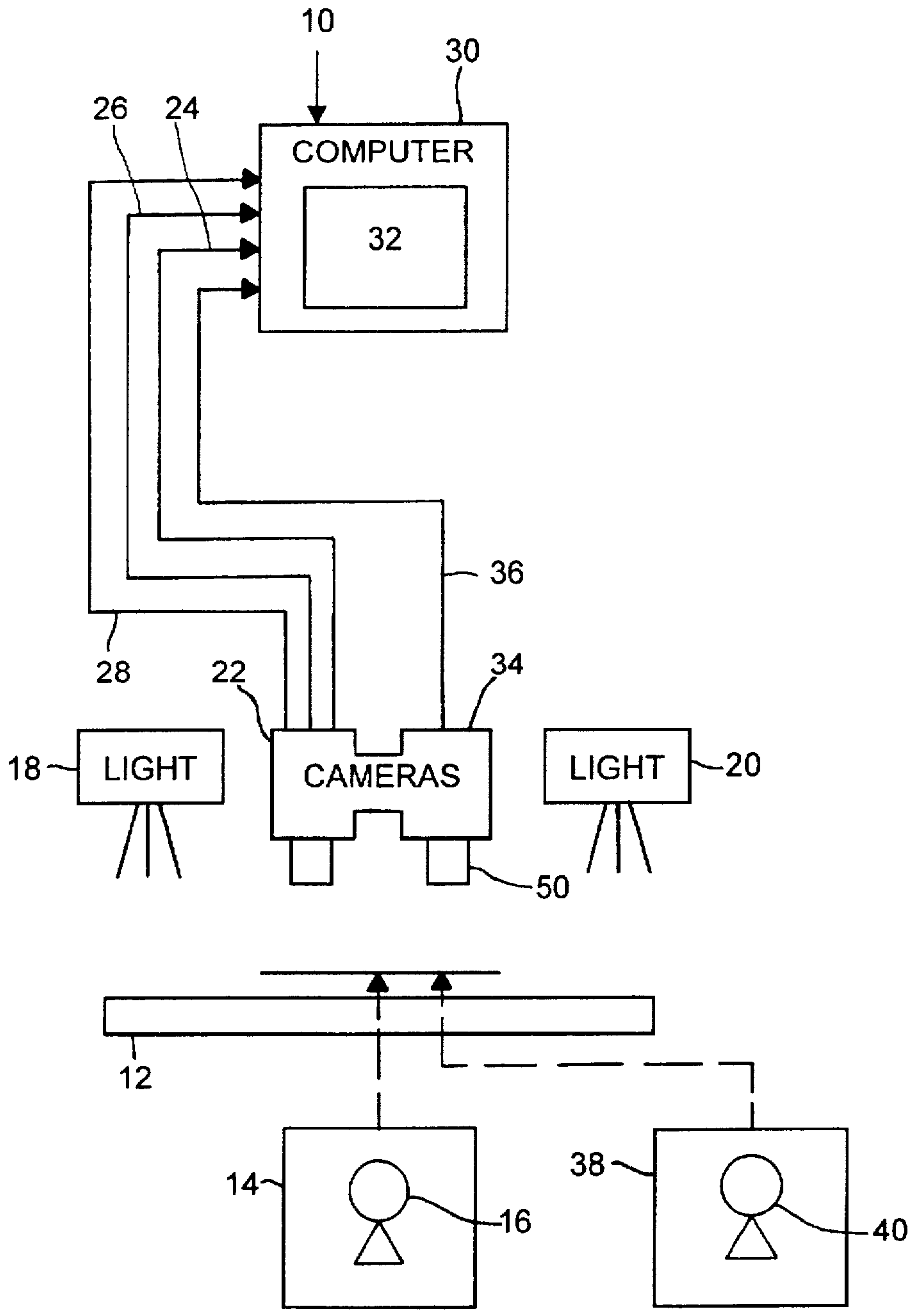
FIG. 2 is a diagrammatic view of the system of FIG. 1.

As shown in FIG. 2, the control system 10 has a support 12 for placement of a sheet of paper 14 with image or indicia 16 on the sheet 14 in a configuration beneath a pair of opposed lights 18 and 20 for illuminating the sheet 14. The system 10 has a first color video camera or sensor 22 having three channels for detecting attributes of the inks from the sheet 14 in the visible region of the electromagnetic spectrum such as red, green and blue, or cyan, magenta, and yellow, and for sending the sensed information over separate lines or leads 24, 26, and 28 to a suitable digital computer 30 or Central Processing unit having a randomly addressable memory (RAM) and a read only memory (ROM), with the computer or CPU 30 having a suitable display 32. Thus, the three distinct color attributes of the inks are sensed by the camera 22 from the sheet 14, and are received in the memory of the computer 30 for storage and processing in the computer 30.

The system 10 also has a black/white second video camera or sensor 34 having a filter 50 such that it senses the attributes of the inks in the infrared region of the electromagnetic spectrum, having a wave length greater than the wave length of the electromagnetic waves in the visible region of light. The camera or sensor 34 thus senses infrared information from the sheet 14, and transmits the sensed information over a lead 36 to the computer 30, such that the infrared information is stored in and processed by the computer 30.

Figure 7:
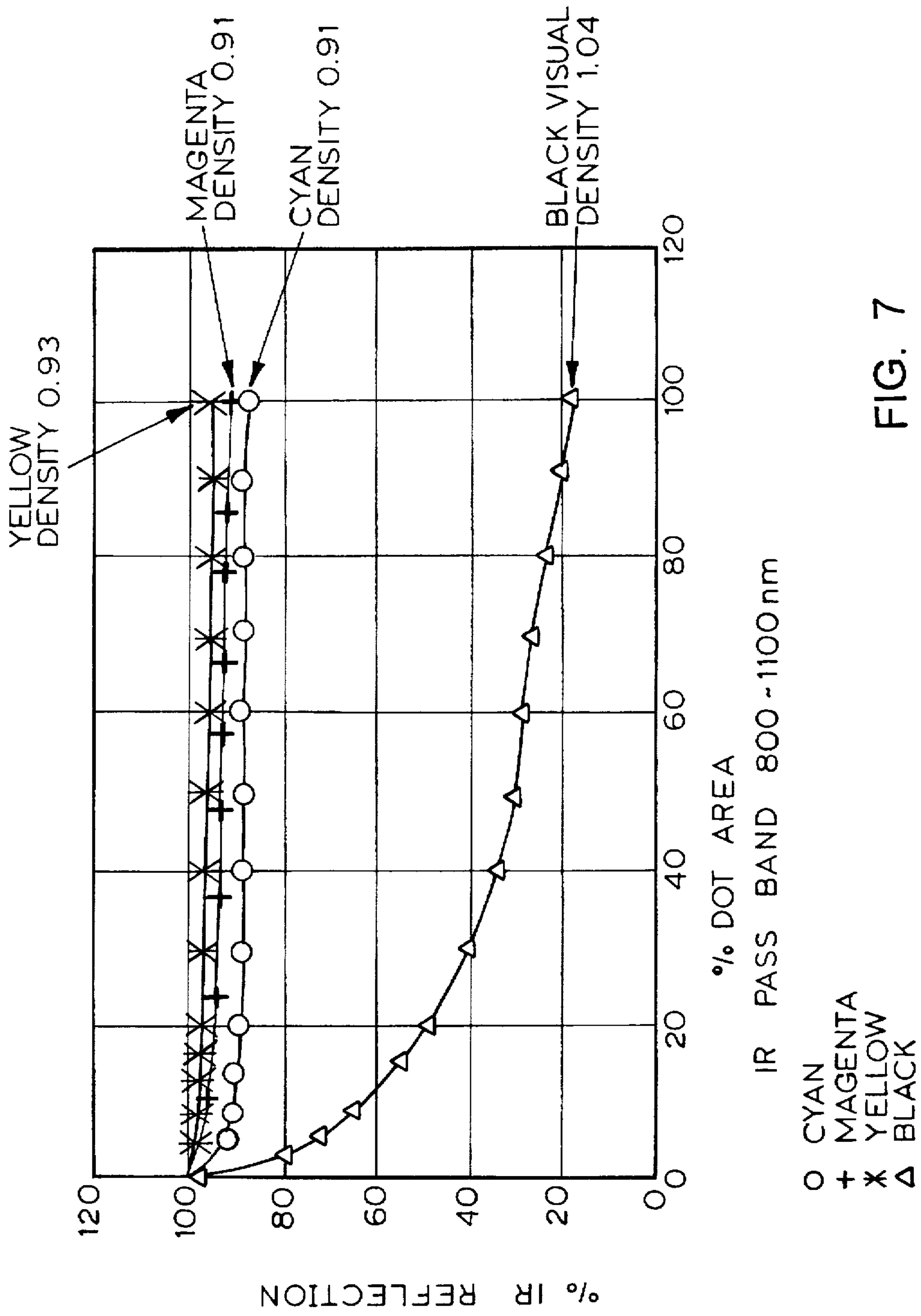
FIG. 7 is a chart plotting the normalized percentage of IR Reflection against the percentage Dot Area in a printed sheet.

The normalized percentage of infrared (IR) reflection vs. the percentage of dot area is show in the chart of FIG. 7. It will be seen that the infrared reflectance of cyan, magenta, and yellow inks show no significant change as a function of percentage of dot area. However, the normalized infrared reflectance of the black ink displays a significant change as a function of percentage of dot area, and changes from a normalized value of 100% IR reflection for 0% dot area to approximately 18% IR reflection corresponding to 100% dot area. Hence, the black ink may be easily sensed and distinguished from other color inks in the infrared region of the electromagnetic waves.

As shown in FIG. 2, the sheet 14 may contain a printed image or indicia 16 which is obtained from a current press run of the press 11, termed a production or current copy. In addition, a sheet 38 containing a printed image or indicia 40, termed a reference copy, from a previous reference press run may be placed on the support 12 beneath the cameras 22 and 34 in order to sense the energy reflected from the sheet 38, and send the sensed information to the memory of the computer 30 for storage and processing in the computer 30, as will be described below. Thus, the cameras or sensors 22 and 34 may be used to sense both the current copy or sheet 14 and the reference copy or sheet 38. The information supplied by the cameras 22 and 34 is formed into digital information by a suitable analog to digital converter in a frame grabber board on the computer 30. Thus, the computer 30 operates on the digital information which is stored in its memory corresponding to the information sensed from the sheets 14 and 34 by the cameras or sensors 22 and 34.

Figure 3:
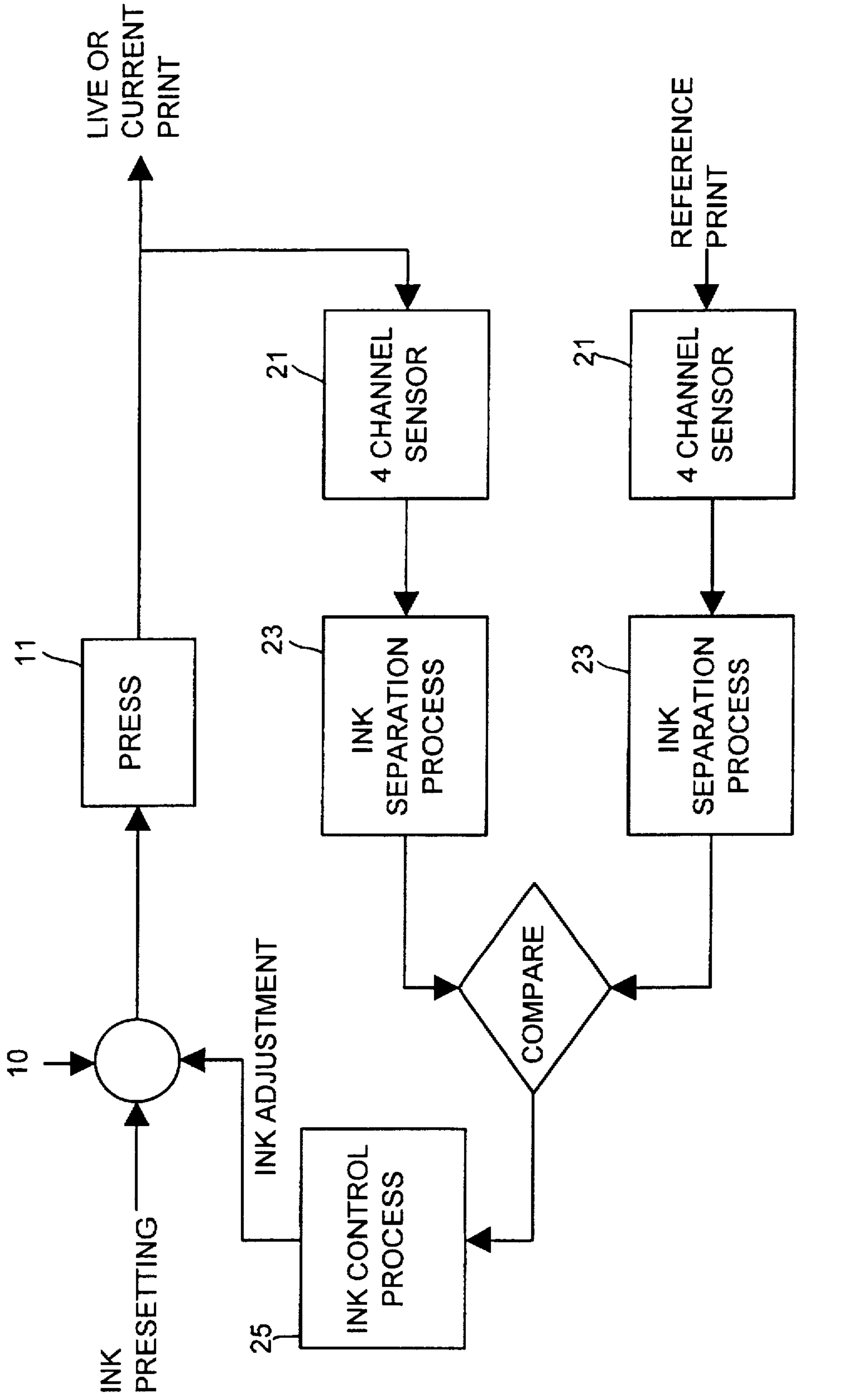
FIG. 3 is a block diagram of the control system of FIG. 1.

Referring now to FIG. 3, there is shown a block diagram of the control system 10 for the printing press 11 of the present invention. As shown, the four inks (cyan, magenta, yellow, and black) of the four-color printing press 11 are first preset, after which a print is made by the press 11 with a current ink setting, thus producing a production or current printed copy, as shown. The color and black/white video cameras or sensors 22 and 34 of FIG. 2 serve as a four channel sensor 21 to capture an image of the current printed copy, and then place this information into the memory of the computer 30 after it has been formed into digital information.

Next, an "Ink Separation Process" 23 is used to convert the red, green, blue and IR images captured by the four channel sensor 21 into four separated cyan, magenta, yellow and black ink images, which represent the amount of corresponding ink presented on the live copy. The "Ink Separation Precess" 23 may utilize mathematic formulas, data look up tables or other suitable means to perform the data conversion task.

The similar processes are also applied to the reference copy. First, the four channel sensor 21 is used to capture the red, green, blue and IR images from the reference copy. Then, the "Ink Separation Process" 23 is utilized to obtain the cyan, magenta, yellow and black ink images, which represent the amount of corresponding ink presented on the reference copy.

As shown, the ink images of the production copy are compared with the ink images of the reference copy by the computer 30 to detect the variation of ink distribution for each of the cyan, magenta, yellow and black inks.

The determined differences in ink distribution are then processed by the computer 30 in order to obtain an indication for controlling the keys or other devices of the press 11 in an ink control process, and thus provide an indication of an ink adjustment to the press to obtain further copies which will have a closer match to the reference copy. The indication of ink changes may be automatically supplied to the press 11, or the operator may utilize the indications of ink color attributes to set the press 11, such as adjustments to ink input rate by using the keys.

In the past, four process inks (cyan, magenta, yellow, and black) have been used on a printing press to produce copies with a gamut of colors. In these systems, the black ink has been used to generate not only the text but also the color image. In a control by image system, the print image of a production copy is compared with the printed image on a reference copy, termed a proof, and the press is adjusted based on the difference between the production image and the reference image. However, within the visible region, it is not possible to reliably distinguish the black ink from the process black made by the combination of cyan, magenta, and yellow inks, or whether the black ink or all cyan, magenta, and yellow inks should be adjusted.

The four channel sensor 21 is utilized to sense not only attributes in three channels of the visible region, the fourth channel of the sensor 21 senses an attribute in the infrared region in order to determine the correct amount of inks, including black ink, to correctly reproduce the proof. The printing press control system uses the four channel detector or sensor 21 to detect the energy reflected from a paper surface, such as the sheets 14 and 38, or the paper web of the press 11, with three channels being in the visible region and one channel being in the infrared region of the electromagnetic spectrum. The control system 10 has a device 23 for converting the output of the sensing device 21 to a set of variables which represent the amount of ink presented on the paper for any of the cyan, magenta, yellow, and black inks, and a device 25 responsive to the converting device 23 for adjusting the four-color printing press 11 to maintain the color consistency.

In a preferred form, the bandwidth of the infrared channel may be between 800 nm and 1100 nm, which is a portion of the near infrared region, and which is compatible with a regular silicon detector, although the working wavelength of the infrared channel may be longer than 1100 nm. At least three distinct channels are utilized in the visible region which may correspond to red, green, and blue (RGB), or cyan, magenta, and yellow (CMY), or other colors. The bandwidth of each channel in the visible region may be less than 70 nm, more than 100 nm, or any value in between, with channels having a multiple peak in its passing band, such as magenta, being also included.

The sensor device 21 may be constructed from either a single element detector, a one-dimensional (linear) detector, a two-dimensional (area) detector, or other suitable detector structure, as will be seen below. The sensor device may be constructed by adding an additional infrared channel to existing devices, adding an infrared channel to a RGB color camera or a densitometer, or by extending the working band into the infrared region, e.g., adding infrared capability to a spectrophotometer. The light source 18 and 20 used provides sufficient radiated energy in both the visible region and the infrared region, depending upon the sensor working band and sensitivity.

Figure 9:
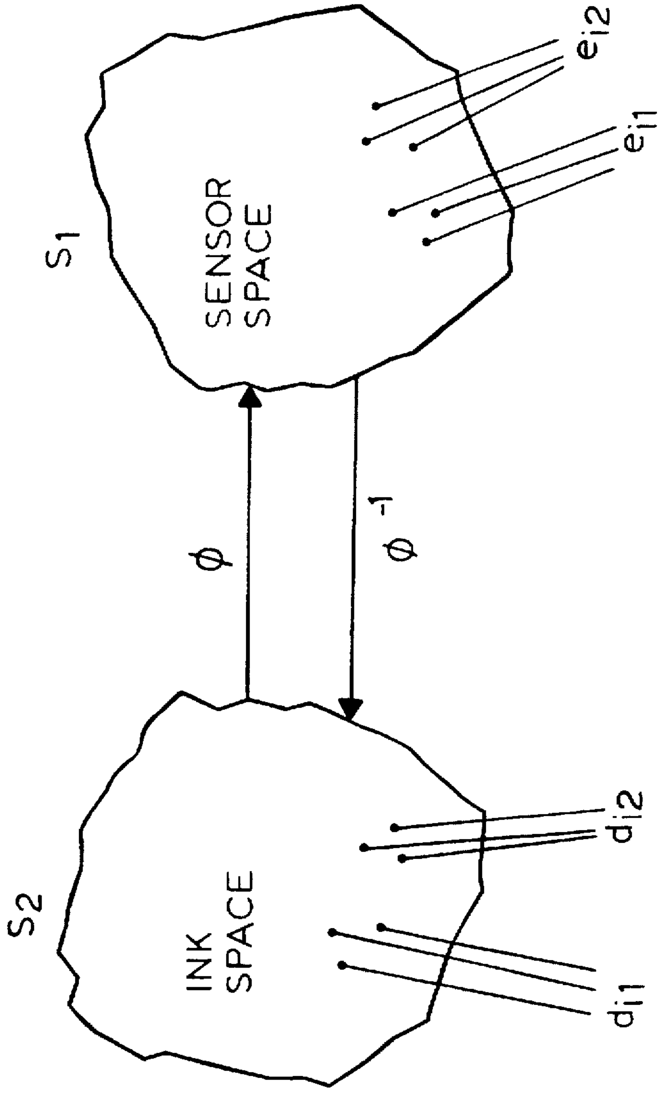
FIG. 9 is a diagrammatic view of set of elements for a sensor space and ink space.

All possible values which are output from the sensor device 21 may be used to form a vector space. For example, all possible values output from the sensor device 21 with red, green, blue and infrared channels form a four dimensional vector space R-G-B-IR, with the vector space being termed a sensor space $S_1$, with each output from the sensor device 21 being termed a vector in the sensor space $S_1$, with the minimum number of dimensions required by the sensor structure being 4. Thus, as shown in FIG. 9, a set $S_1$ of elements $e_{11}$ and $e_{12}$ being given, with the elements $e_{11}$ of the set $S_1$ being the vectors $v_{11}$ corresponding to the output from the sensor device 21 of sensing a production or current printed copy, and with the elements $e_{12}$ of the set $S_1$ being the vectors $v_{12}$ corresponding to the output from the sensor device 21 sensing a reference printed copy. In accordance with the present invention, the printed image on a production or current copy may be compared with the printed image on a reference copy in the sensor space, and if the difference between the live copy $L.C._s$ and the reference copy $R.C._s$ is within a predefined tolerance level delta, at least for all the channels in the visible region of the sensor space, such that, $| L.C._s - R.C._s |$ <delta, the production or current copy is said to be acceptable by definition.

A set of variables may be defined to represent the amount of ink presented in a given area. For example, a set of variables C, M, Y, and K can be defined to represent or be a function of the amount of cyan, magenta, yellow, and black ink in a given area. This set of variables may correspond to the ink volume, average ink film thickness, dot size, or other quantities related to the amount of ink in a given area on the paper surface. The vector space formed by this set of variables is termed an ink space $S_2$, with the ink space $S_2$ having a dimension of 4 for a four color printing press 11. Thus, with reference to FIG. 9, a set $S_2$ of elements $d_{11}$ and $d_{12}$ are given, with the elements $d_{11}$ of the set $S_2$ being the vectors $v_{j1}$ corresponding to the variables associated with the production or current copy in the ink space $S_2$, and with the elements $d_{12}$ of the set $S_2$ being the vectors $v_{j2}$ corresponding to the variables associated with the reference copy in the ink space $S_2$.

Figure 10:
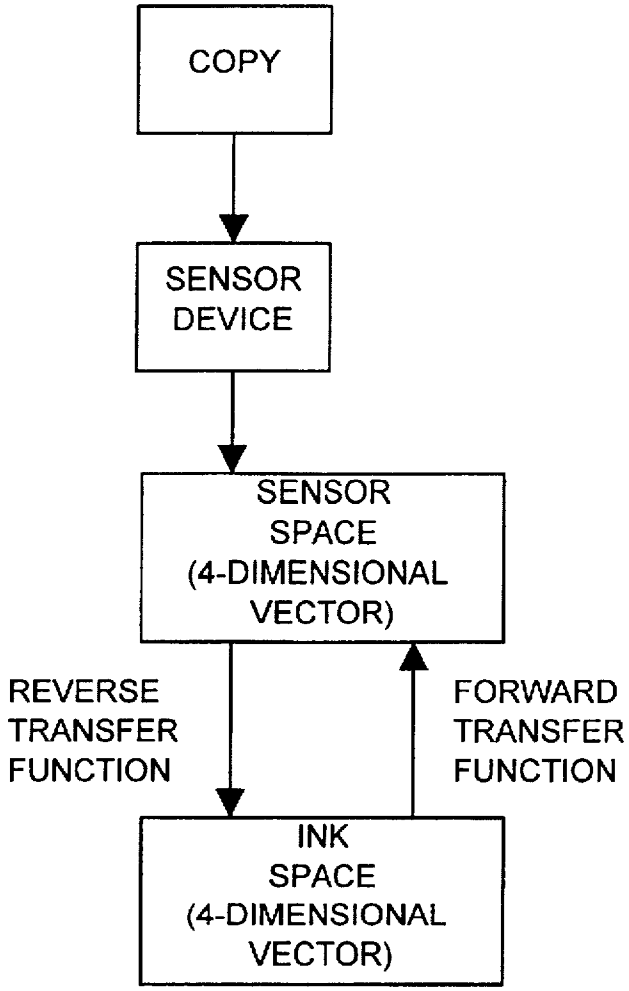
FIG. 10 is a block diagram of the sensor space and ink space in conjunction with the control system of the present invention.

With reference to FIG. 9, there exists at least one transfer function or transformation phi which can map the elements $d_{11}$ and $d_{12}$ of the set $S_2$ or the four dimensional ink space, into the elements $e_{11}$ and $e_{12}$ of the set $s_1$ or the four dimensional sensor space, with the transformation phi being termed a forward transfer function, as shown in FIGS. 9 and 10. It is noted that the subsets in each set $S_1$ and $S_2$ may overlap or may be the same.

The forward transfer function may be used in a soft proof system which can generate a proof image which can be stored in the system as a reference or can be displayed on a CRT screen.

With further reference to FIG. 9, there exists at least one transfer function or reverse transformation $phi^{-1}$ which can map the elements $e_{11}$ and $e_{12}$ of the set $S_1$ of the four dimensional sensor space into the elements of $d_{11}$ and $d_{12}$ of the set $S_2$ of the four dimensional ink space, with the transfer function being termed a reverse transfer function. Thus, both the production image and the reference image in the sensor space or set $S_1$ can be mapped into the ink space or set $S_2$ by applying the reverse transfer function $phi^{-1}$ point by point as shown in FIGS. 9 and 10.

Figure 11:
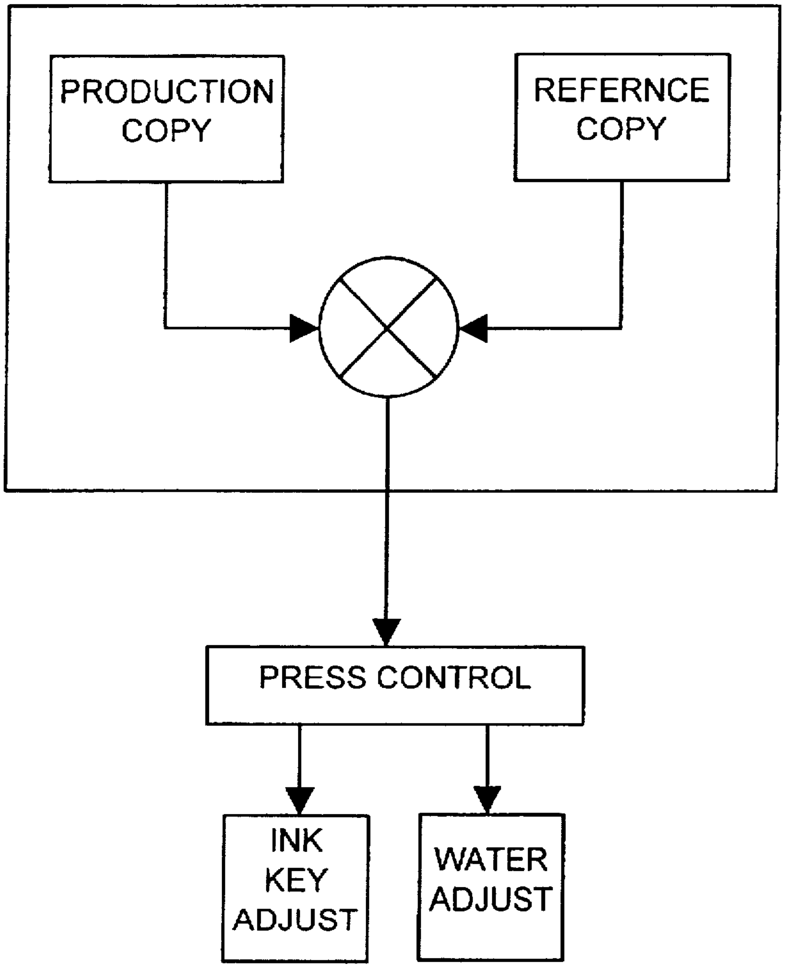
FIG. 11 is a block diagram of the control system for adjusting the printing press.

The difference between the production image and the reference image in the ink space $S_2$ thus represents the difference of the ink distribution for each of the cyan, magenta, yellow, and black inks, as shown in FIG. 11. The difference between the live and reference images in the ink space $S_2$ indicates which printing unit should be adjusted, which direction, up or down, it should be adjusted, and the amount of ink which should be adjusted. A suitable press control formula may be developed to adjust press parameters, such as ink input rate in lithographic or letterpresses, ink consistency in flexographic or gravure presses, water input rate in lithographic presses, or temperature in any of the above, based on the differences between the production and the reference image in the ink space $S_2$.

In accordance with the present invention, the press adjustments can be achieved by the automatic control system 10, by press operator alone, or by the interaction between the automatic control system 10 and the press operator. Also, the sensor device 21 may be used to monitor the printing web of the press 11 directly, i.e., on press sensing, or to monitor the prints collected from the folder of the press, i.e., off press sensing. If the digital images from the color separation processing, or the film/plate images are available, the image of the reference copy in the sensor device 21 can be generated electronically by the forward transfer function phi. The electronically generated reference may be used to set up the press 11 in order to reduce the make ready time.

The color reproduction quality can be maintained through the entire press run, through different press runs on different presses, or at different times. Thus, a closed loop automatic color reproduction control system may be formed without an additional color control target. The variation of ink, paper, and other press parameters can be compensated such that the printed copies have the highest possible overall results in matching the reference copy.

Figure 4:
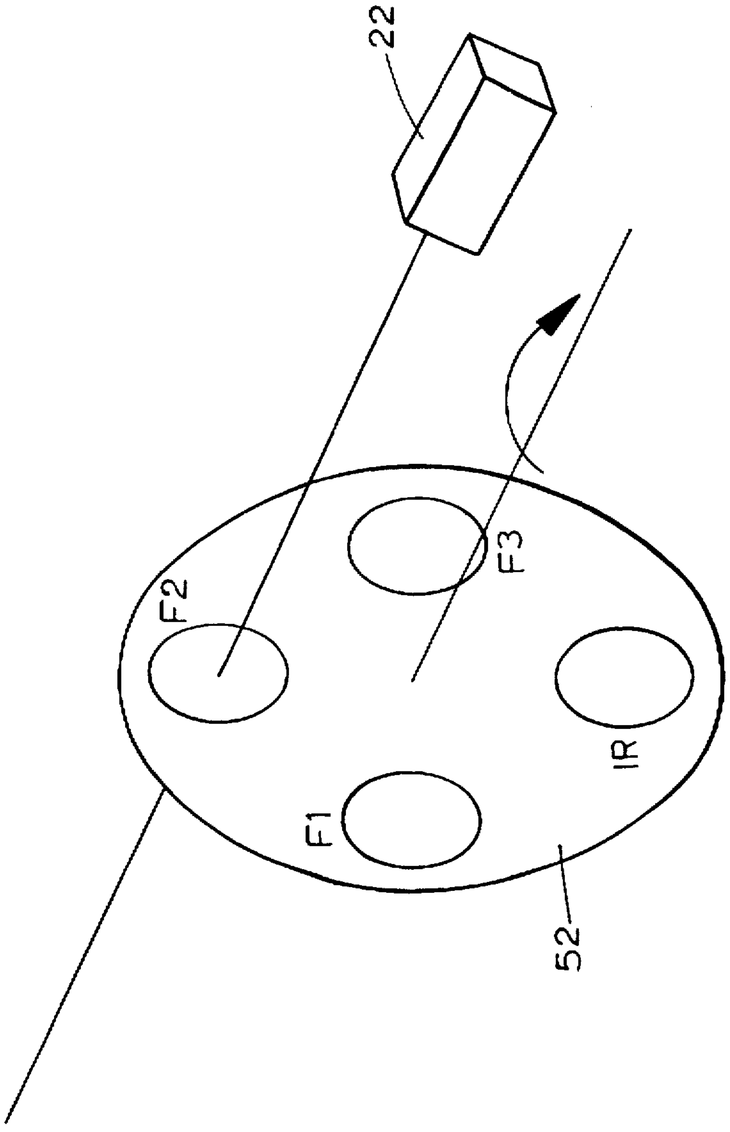
FIG. 4 is a diagrammatic view of a camera or sensor for the control system of the present invention.

As shown in FIG. 4, the camera or sensor 22 may be associated with a rotating filter member 52 having filters which only transmit the desired colors $F_1$, $F_2$, and $F_3$, such as red, green, and blue during rotation, such that the camera or sensor 22 senses and records the colors $F_1$, $F_2$, and $F_3$, sequentially or separately from the printed material which may be taken either from the current press run or from the reference press run. In addition, the filter member 52 may have an infrared (IR) filter $F_4$ in order to sense and record the energy reflected form the printed material in the infrared region. The information received by the camera or sensor 22 from the filters may be recorded in the computer or CPU for use in forming the desired data to control the inks, as previously discussed.

Figure 5:
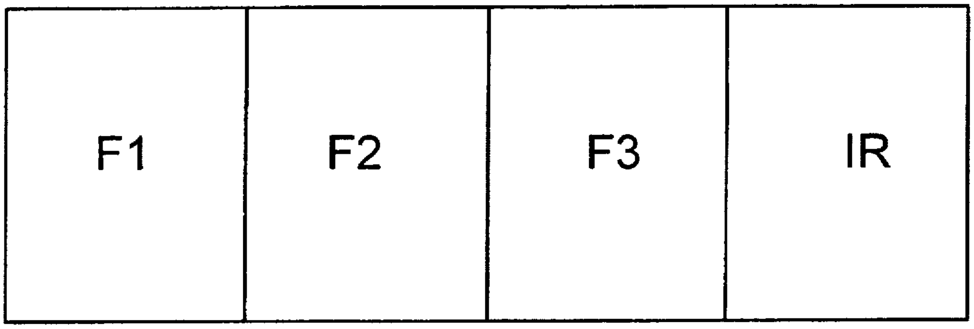
FIG. 5 is a diagrammatic view of another embodiment of the camera or sensor for the control system for the present invention.

In another form as shown in FIG. 5, the camera or sensor 22 may comprise a charge coupled device (CCD) with built in filters which converts light energy reflected from the printed material into electric energy in a video camera, i.e. $F_1$, $F_2$, $F_3$, and $F_4$, (IR), such as the distinct colors red, green, and blue in the visible region, and the near infrared energy in the infrared region, in order to supply the information to the computer 30 for storage and processing, as previously discussed.

Figure 6:
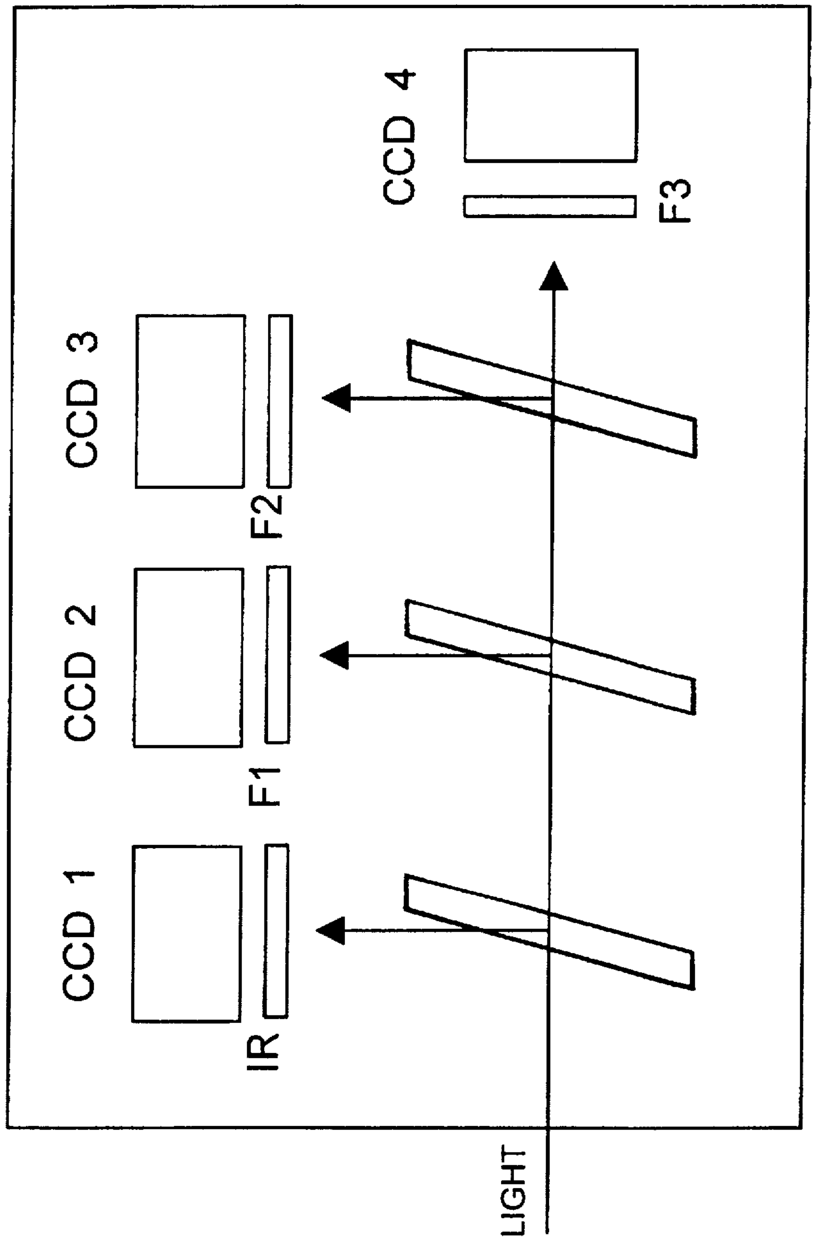
FIG. 6 is a diagrammatic view of a further embodiment of a camera or sensor for the control system of the present invention.

Another embodiment of the camera or sensor 22 of the present invention is illustrated in FIG. 6, in which like reference numerals designate like parts. In this embodiment, the camera or sensor 22 has a beam splitter in order to separate the incoming light reflected from the printed material into an infrared beam for a first CCD 1, $F_1$ such as red for a second CCD 2, $F_2$ such as green for a third CCD 3, and $F_3$ such as blue for a fourth CCD. In this embodiment, suitable prisms, lenses, or mirrors may be utilized to accomplish the beam splitting of light in order to obtain the desired color attributes in the various charge coupled devices to supply the information to the computer 30 for storage and processing in the computer 30, in a manner as previously described. Of course, any other suitable camera or sensing device may be utilized to obtain the desired colors.

Thus, a control system 10 for a printing press 11 is provided which ascertains three distinct attributes, such as colors, in the visible region of electromagnetic waves and an attribute in the infrared region of the electromagnetic spectrum for the printed inks. The control system 10 utilizes these four attributes in a four channel device to indicate and control the ink colors for use in the press 11.

Thus, the colors may be sensed from a sheet taken during a current press run, and from a sheet taken during a reference press run, after which the sensed information is utilized in order to modify ink settings of a press 11 in order to obtain repeatability of the same colors from the reference run to the current press run. In this manner, a consistent quality of colors may be maintained by the printing press 11 irrespective of the number of runs after the reference run has been made, and may be continuously used during a press run if desired.

A camera based color sensing device for a printing press control system usually comprises of a set of lamp fixtures and a camera assembly. In order to accurately control the printing process, this color sensing device should provide a position-invariant and time-invariant measurement.

However, many factors will effect the consistency and repeatability of the system. The lens has an uneven light transmittance from the center to the border. The amount of light produced by the lamp fixtures varies from time to time. The sensitivity of the image sensor may also drift due to temperature variation and aging. Device and calibration procedures are needed to provide a standard viewing condition for this camera based color sensing system.

As shown in FIG. 12, a four channel camera assembly 108 is used for capturing images. However, an integrated four channel camera, such that shown in FIG. 5 or 6, has not yet become commercially available at the present time. The two-camera approach shown in FIG. 2 provides a convenient way to reconstruct this four channel camera 108. In this embodiment, a color camera is used for capturing red, green and blue images and a monochrome camera for capturing near infrared images. Each of these four camera channels normally comprises a Charge Coupled Device (CCD) image sensor. The working wavelength range of this camera assembly is from 400 nm to about 1000 nm. This is about twice the range of the visible light spectrum. Like any other optical components, the light transmitting characteristics of the lens is wavelength related. A special lighting arrangement is often needed to ensure that a standard viewing condition can be established for each of these four camera channels, even if two cameras and two lenses are used. This standard viewing condition is also needed to maintain measurement consistency between two different color sensing systems.

Figure 13:
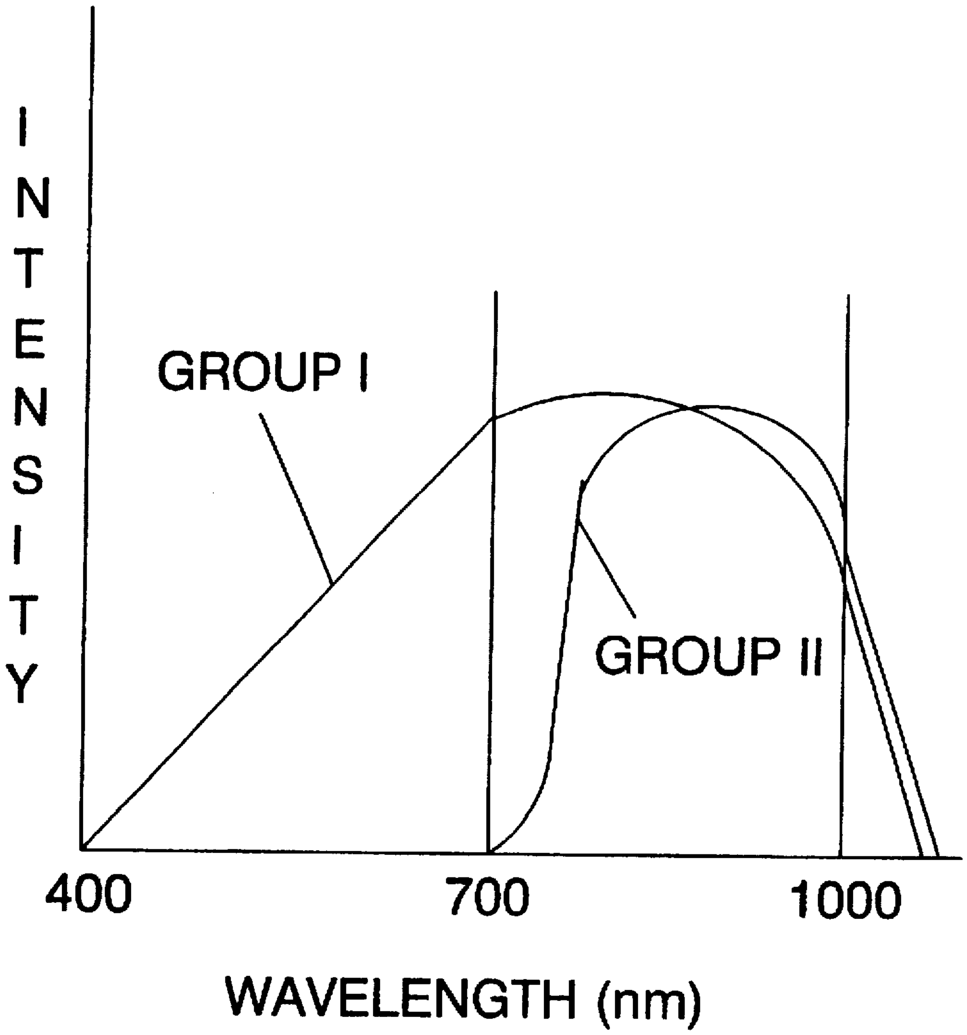
FIG. 13 is a chart showing the intensity of the output of two groups of lamps in the lighting arrangement.

As shown in FIGS. 12 and 13, the preferred light source comprises a first and second groups of lamps 100 and 102, respectively, to provide light in both the visible region (400–700 nm) and the near infrared region (700–1000 nm). At least one of the two groups of lamps 100 or 102 operates only in a single region, either the visible or the near infrared region, but not in both. For example, the first group of lamps has an output in both the visible and infrared regions. This covers the entire 400–1000 nm spectrum. The second group of lamps 102 has an output in the infrared region (700–1000 nm) only.

A halogen lamp is rich in energy in the desired 400–1000 nanometer spectrum and can be used in the two lamp groups 100 and 102. Some halogen lamps have filters to reduce the undesirable energy output in wavelengths longer than 1000 nm. A lamp MR16 sold by General Electric with a Constant Color Coating is an example of one such lamp.

Figure 14:
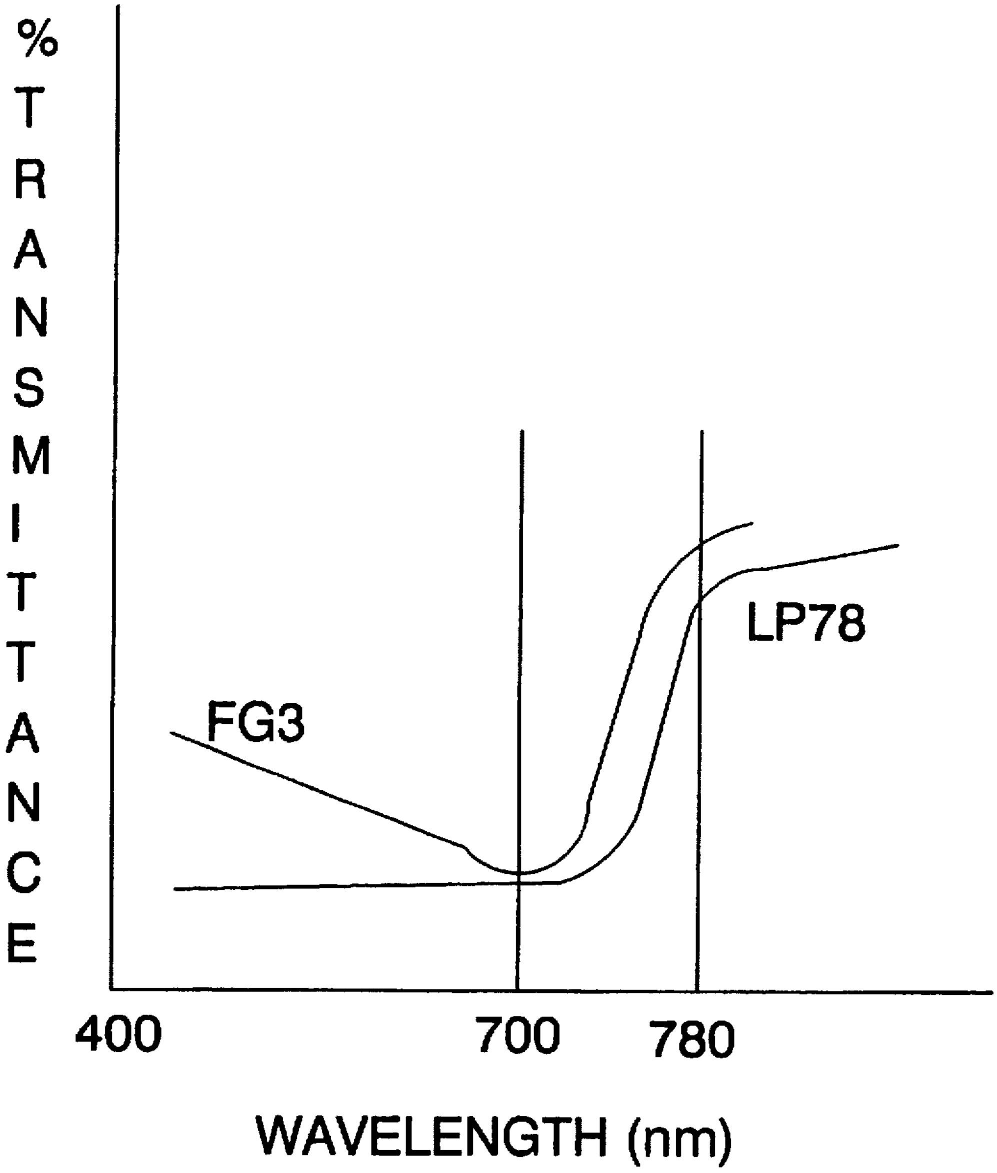
FIG. 14 is a chart showing percentage of transmittance of two filters used with the lamps.

As shown in FIG. 14, energy output can be constrained to the desired spectral region by using optical filters. A tempered color temperature compensation filter, such as a SCHOTT FG3 filter with a proper thickness is used in front of the first lamp group 100 to provide a standard D50 light source with energy extended into the near infrared region. Lamps in the second group 102 can be fitted with a tempered filter, such as a SCHOTT LP78 filter, to block visible light while passing infrared light longer than 780 nm. In order to reduce the ripple component in the light output, a DC power supply can be used to drive these halogen lamps.

Other light sources, such as Xenon lamps, can be used, as long as they provide enough energy in both the visible and near infrared regions. It is not necessary that the size of the lamp be small. Lamps with large physical dimensions can also be used. Linear lamps would be an example of the device where light output is present over a large area.

As shown in FIGS. 12 and 12*a*, a calibration target 106 with a uniform light reflectance in the visible and the near infrared region is positioned under a rectangular camera viewing area 104.

A blank sheet of paper can be used as the calibration target 106 if it remains flat and smooth, and its material content is homogeneous without granularity. Since this type of paper is not prevalent and the quality is difficult to maintain, a special calibration target can be constructed. A uniform gray calibration target can be made with various paints and surface modifying agents so as to have a flat spectral curve from 400–1000 nm. The gloss of this target is similar to that of a blank sheet of paper used to print a reference or production copy.

As shown in FIGS. 12 and 12*a*, the calibration target 106 is positioned in the field of view 104 of a four channel camera 108 so that the target surface is near perpendicular to the optical axis of the camera 108. The light source is mounted 45 degrees with respect to the camera optical axis to reduce the direct reflection from the target. All remaining surfaces outside the viewing are painted black with a mat finish.

A display lookup table is created to cause certain pixel values to become more prominent as viewed on a color monitor. This allows the operator to distinguish small changes in camera values so that the lamps can be adjusted to cause the light over that target surface to appear more uniform. Using the above viewing method with a lookup table, the first group of lamps 100 is adjusted to minimize the unevenness in the green image. This can be done by pointing the lamps 100 to a different position, readjusting the reflector of the lamps if it exists, or altering the light distribution pattern by using a mesh screen material or neutral density filters. The unevenness is checked in the red and blue images. If the light distribution patterns in the red and blue images are substantially different than that in the green image, the spectral output of the individual lamps and filters should be checked and corrected if necessary. While keeping the first group of lamps 100 unchanged, the second group of lamps 102 is adjusted so that the unevenness of the infrared image is also minimized. Statistics for each image, like standard deviation and average value, can be used to assist this operation.

Multiple images are captured from the calibration target 106 under this lighting condition. The images are averaged to remove individual pixel noise. A neighborhood averaging technique may be used to remove any high spatial frequency noise. The highest pixel value is found within each averaged image. An intermediate image is created by dividing this value by each of the pixel values in the averaged image. Each pixel in the intermediate image is then multiplied by a constant gain factor, e.g., 128 for an 8-bit image. This will create a light compensation image for each of the four channels.

The compensation process can be started by multiplying an image of interest with the light compensation image. The result of this multiplication is then divided by the constant gain factor. The purpose of this operation is to raise pixel values in the darker areas to a level equal to those in the brightest area. The resulting image corresponds to the image of interest as if it had been viewed under a uniform light condition.

The above compensation goal also can be achieved by lowering the pixel values in the brightest areas to a level equal to those in the darkest areas.

Applying the above position related compensation process to an image captured from the calibration target 106 will cause the resultant image to become uniform. When this compensation process is applied to any other captured image, it provides pixel values for the image as if the target was illuminated by a perceived uniform lighting condition. This implies that as the target is moved within the field of view, image features will maintain consistent pixel values. Thus, this position related compensation provides a position-invariant viewing condition to this color sensing system.

Figure 15:
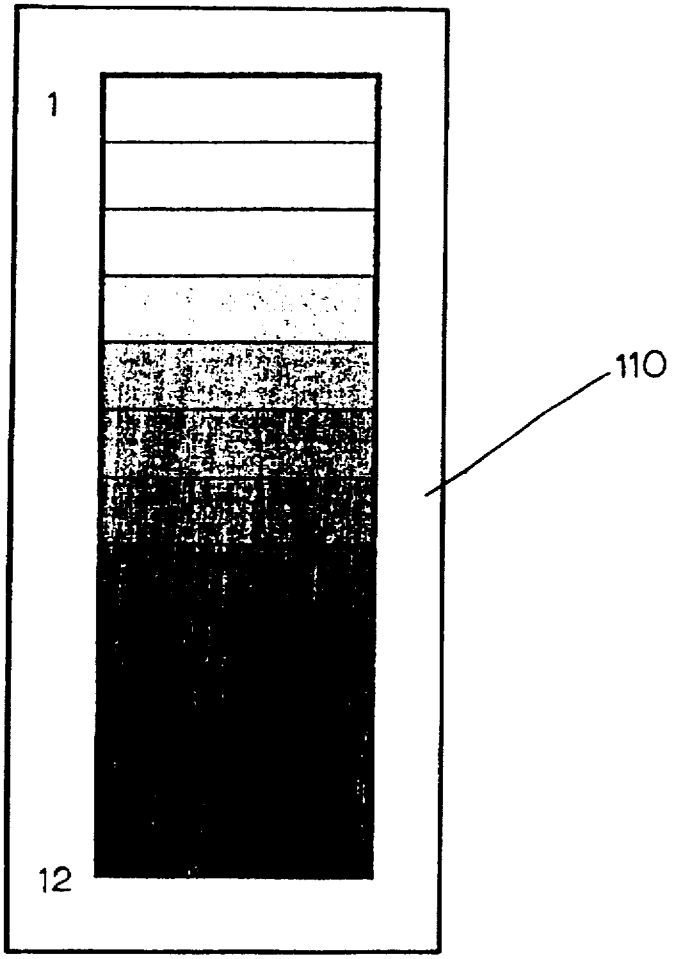
FIG. 15 is a diagrammatic view of a multi-step calibration target.

In order to reduce the variation caused by the drifting of the lamp and electronics, a gray scale calibration target can be used. As shown in FIG. 15, a gray scale calibration target 110 consists of 12 steps, each with different darkness. The darkest and lightest steps should represent the highest density encountered during the printing process and the whitest paper used, respectively. The number of steps included in this gray scale is based on the accuracy required. Normally, 10 through 30 steps should be sufficient. The material used to make this target should have a flat spectral curve.

After creating this multi-step target, measure the light reflectance from each step over the wavelength range from 400 nm through 1000 nm. Then calculate the averaged reflectance within the bandwidth of each camera channel for each step.

The next thing to do is to determine a desired camera value for the lightest step. This value should be chosen high enough to provide a wide dynamic range, but be low enough to prevent camera saturation under typical viewing conditions. Normally, the sensing device has a known relation between the light input and the signal output, such as a linear or a logarithm relation. Thus, desired camera values for other steps can be calculated accordingly. Representative data showing averaged reflectance and desired camera values of a 12 step target are provided in Table 1.

During the system setup, adjust iris or camera gains so that the camera value obtained from the lightest step is as close to its desired value as possible. Lock the iris or camera gain settings to prevent any possible changes.

The following paragraphs show a compensation procedure utilizing this multi-step target to eliminate any effect caused by component drifting.

Figure 16:
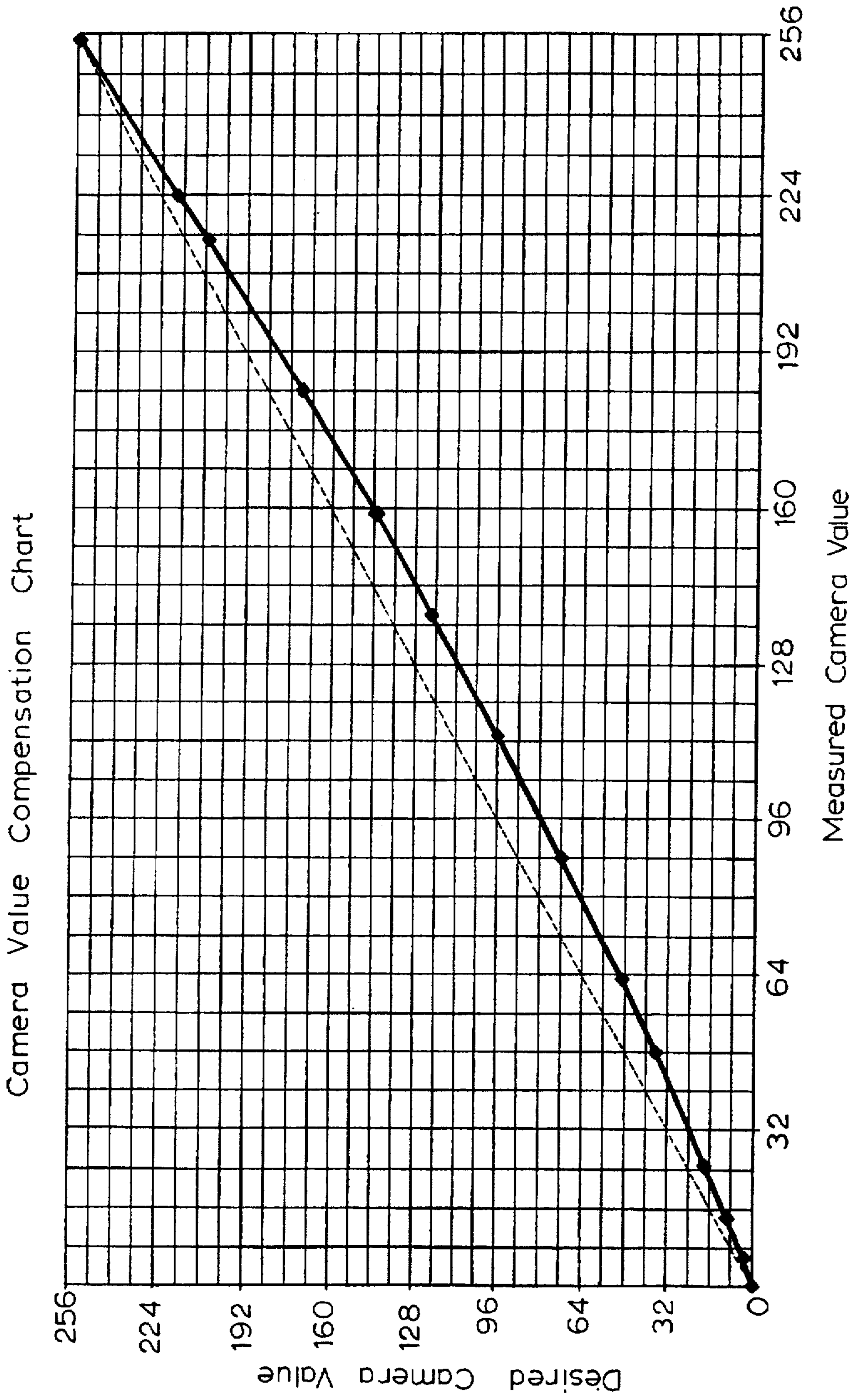
FIG. 16 is a chart showing a mapping between measured camera values and desired camera values.

Capture an image from this gray scale target. To reduce any stray light, a black background should be used behind the gray target. Apply the position related compensation to this image. Obtain camera values for each channel and each step as shown in Table 1. Put the desired camera value and the measured camera value in a graph for each camera channel. An example of blue channel data is shown in FIG. 16. Each data value represents a point in the graph in FIG. 16. A mapping can be created by connecting these points on the graph. A thin dotted straight line is also included in FIG. 16 to show the linear relationship. This mapping can be easily implemented by a data lookup table. Mappings for other channels can be generated in a similar way.

The above procedure should be performed periodically to compensate any possible component drifts. Thus, this camera value related compensation provides a time-invariant viewing condition and greatly improves the system repeatability.

By applying the position related compensation and then the camera value related compensation, a standard viewing condition can be established. The position-invariant and time-invariant requirements are satisfied.

Thus, in accordance with the present invention a standard viewing condition is provided for the camera based color sensing system to provide improved results in the control system of the printing press.

The forgoing detailed description has been given for clearness of understanding only, and no unnecessary limitations should be understood therefore, as modifications will be obvious to those skilled in the art.

TABLE 1

Sheet 1

| | Averaged Reflectance | | | | Desired Camera Value | | | | Measured Camera Value | | | |
|---|---|---|---|---|---|---|---|---|---|---|---|---|
| Step | Blue | Green | Blue | NIR | Blue | Green | Blue | NIR | Blue | Green | Blue | NIR |
| 1 | 0.888 | 0.919 | 0.922 | 0.8908 | 218 | 226 | 227 | 226 | 224 | 234 | 230 | 220 |
| 2 | 0.842 | 0.872 | 0.866 | 0.8212 | 207 | 214 | 213 | 208 | 215 | 223 | 218 | 201 |
| 3 | 0.698 | 0.716 | 0.716 | 0.6854 | 172 | 176 | 176 | 174 | 184 | 187 | 185 | 169 |
| 4 | 0.582 | 0.603 | 0.604 | 0.584 | 143 | 148 | 149 | 148 | 159 | 161 | 160 | 144 |
| 5 | 0.495 | 0.51 | 0.512 | 0.493 | 122 | 125 | 126 | 125 | 138 | 138 | 137 | 123 |
| 6 | 0.39 | 0.402 | 0.404 | 0.3884 | 96 | 99 | 99 | 99 | 113 | 110 | 109 | 98 |
| 7 | 0.294 | 0.302 | 0.301 | 0.2864 | 72 | 74 | 74 | 73 | 88 | 83 | 83 | 73 |
| 8 | 0.199 | 0.205 | 0.204 | 0.1958 | 49 | 50 | 50 | 50 | 63 | 58 | 57 | 52 |
| 9 | 0.148 | 0.152 | 0.151 | 0.1444 | 36 | 37 | 37 | 37 | 48 | 43 | 43 | 39 |
| 10 | 0.075 | 0.074 | 0.072 | 0.068 | 18 | 18 | 18 | 17 | 25 | 21 | 21 | 22 |
| 11 | 0.039 | 0.037 | 0.036 | 0.0356 | 10 | 9 | 9 | 9 | 14 | 10 | 11 | 13 |
| 12 | 0.013 | 0.012 | 0.012 | 0.012 | 3 | 3 | 3 | 3 | 6 | 4 | 4 | 7 |

What is claimed is:

1. A device to provide a substantially uniform lighting condition as perceived by a color sensing device for a control system in a printing press, comprising:

a first lamp for generating light in at least a visible region of a light spectrum;

a second lamp for generating light in only an infrared region of the light spectrum;

a calibration target; and means for capturing images in the visible and the infrared regions;

wherein the light output by the first lamp is adjustable to reduce unevenness in a first image captured by the capturing means in the visible region, and the light output by the second lamp is adjustable to reduce unevenness in a second image captured by the capturing means in the infrared region to thereby develop a substantially uniform lighting condition as perceived by a color sensing device.

2. A device as defined in claim 1 further comprising position compensation means for applying a position related compensation process to images captured by the capturing means to produce a position-invariant viewing condition.

3. A device as defined in claim 2 wherein the position compensation means generates a compensation image from at least one image captured by the capturing means from the calibration target, and the position compensation means applies the compensation image to subsequent images captured by the capturing means to provide the position-invariant viewing condition.

4. A device as defined in claim 2 wherein the position compensation means comprises a central processing unit.

5. A device as defined in claim 1 wherein the capturing means comprises a camera, and further comprising camera value compensation means for applying at least one camera value related compensation process to images captured by the capturing means to produce a time-invariant viewing condition.

6. A device as defined in claim 5 wherein the camera value related compensation means comprises a central processing unit.

7. A device as defined in claim 5 wherein the at least one camera value related compensation process is implemented through a lookup table.

8. A device as defined in claim 5 wherein the at least one camera value related compensation process is developed from captured images of a gray scale.

9. A device as defined in claim 1 wherein the capturing means comprises a camera assembly having four channels.

10. A device as defined in claim 9 wherein the four channels comprise red, green, blue, and infrared channels.

11. A device as defined in claim 10 wherein the camera assembly comprises a color camera and a monochrome camera, the color camera providing the red, green and blue channels and the monochrome camera providing the infrared channel, the color camera having a lens and the monochrome camera having a lens.

12. A device as defined in claim 10 wherein the camera assembly comprises an integrated four channel camera having a single lens.

13. A device as defined in claim 9 wherein each channel of the camera assembly comprises a Charge Coupled Device image sensor.

14. A device as defined in claim 1 wherein the capturing means has an associated optical axis, the optical axis being substantially perpendicular to a surface of a viewing area.

15. A device as defined in claim 14 wherein the first lamp is positioned to emit light at an approximately 45 degree angle to the optical axis.

16. A device as defined in claim 14 wherein the second lamp is positioned to emit light at an approximately 45 degree angle to the optical axis.

17. A device as defined in claim 1 wherein the calibration target comprises a blank sheet of paper.

18. A device as defined in claim 1 wherein the calibration target includes a painted working surface having a glossiness and lightness which is substantially similar to glossiness and lightness of a blank sheet of paper.

19. A device as defined in claim 1 wherein the calibration target has a substantially flat spectral reflectance curve at least in a wavelength range from approximately 400 nm to 1000 nm.

20. A device as defined in claim 1 wherein the light output by the first lamp is adjusted via a mesh screen.

21. A device as defined in claim 1 wherein the light output by the first lamp is adjusted via a neutral density filter.

22. A device as defined in claim 1 wherein the light output by the first lamp is adjusted by changing an orientation or position of the first lamp.

23. A device as defined in claim 1 wherein the output of the second lamp is adjusted via a mesh screen.

24. A device as defined in claim 1 wherein the output of the second lamp is adjusted via a neutral density filter.

25. A device as defined in claim 1 wherein the output of the second lamp is adjusted by changing an orientation or position of the second lamp.

26. A device as defined in claim 1 further comprising a display for viewing the images obtained by the capturing means and a programmable display lookup table for making image intensity variation appear more prominent on the display.

27. A device as defined in claim 1 wherein the first image is a green image.

28. A device as defined in claim 1 wherein a third image and a fourth image captured by the capturing means in the visible region are checked for unevenness to detect a need for correcting spectral output of the first lamp, and wherein the first image is a green image, the third image is a red image, and the fourth image is a blue image.

29. A device as defined in claim 1 wherein the first lamp comprises a set of lamps.

30. A device as defined in claim 1 wherein the second lamp comprises a set of lamps.

31. A device as defined in claim 1 wherein the first lamp generates light in the visible and the infrared regions of the spectrum.

32. A device to provide a substantially uniform lighting condition as perceived by a color sensing device for a control system in a printing press, comprising:

a first lamp for generating light in only a visible region of a light spectrum;

a second lamp for generating light in at least an infrared region of the light spectrum;

a calibration target; and means for capturing images in the visible and the infrared regions;

wherein the light output by the first lamp is adjustable to reduce unevenness in a first image captured by the capturing means in the visible region, and the light output by the second lamp is adjustable to reduce unevenness in a second image captured by the capturing means in the infrared region to thereby develop a substantially uniform lighting condition as perceived by a color sensing device.

33. A device as defined in claim 32 further comprising position compensation means for applying a position related compensation process to images captured by the capturing means to produce a position-invariant viewing condition.

34. A device as defined in claim 33 wherein the position compensation means generates a compensation image from at least one image captured by the capturing means from the calibration target, and the position compensation means applies the compensation image to subsequent images captured by the capturing means to provide the position-invariant viewing condition.

35. A device as defined in claim 33 wherein the position compensation means comprises a central processing unit.

36. A device as defined in claim 32 wherein the capturing means comprises a camera, and further comprising camera value related compensation means for applying at least one camera value related compensation process to images captured by the capturing means to produce a time-invariant viewing condition.

37. A device as defined in claim 60 wherein the camera value related compensation means comprises a central processing unit.

38. A device as defined in claim 36 wherein the at least one camera value related compensation process is implemented through a lookup table.

39. A device as defined in claim 36 wherein the at least one camera value related compensation process is developed from captured images of a gray scale.

40. A device as defined in claim 32 wherein the capturing means comprises a camera assembly having four channels.

41. A device as defined in claim 40 wherein the four channels comprise red, green, blue, and infrared channels.

42. A device as defined in claim 41 wherein the camera assembly comprises a color camera and a monochrome camera, the color camera providing the red, green and blue channels and the monochrome camera providing the infrared channel, the color camera having a lens and the monochrome camera having a lens.

43. A device as defined in claim 41 wherein the camera assembly comprises an integrated four channel camera having a single lens.

44. A device as defined in claim 40 wherein each channel of the camera assembly comprises a Charge Coupled Device image sensor.

45. A device as defined in claim 32 wherein the capturing means has an associated optical axis, the optical axis being substantially perpendicular to a surface of a viewing area.

46. A device as defined in claim 45 wherein the first lamp is positioned to emit light at an approximately 45 degree angle to the optical axis.

47. A device as defined in claim 45 wherein the second lamp is positioned to emit light at an approximately 45 degree angle to the optical axis.

48. A device as defined in claim 32 wherein the calibration target comprises a blank sheet of paper.

49. A device as defined in claim 32 wherein the calibration target includes a painted working surface having a glossiness and lightness which is substantially similar to glossiness and lightness of a blank sheet of paper.

50. A device as defined in claim 32 wherein the calibration target has a substantially flat spectral reflectance curve at least in a wavelength range from approximately 400 nm to 1000 nm.

51. A device as defined in claim 32 wherein the light output by the second lamp is adjusted via a mesh screen.

52. A device as defined in claim 32 wherein the light output by the second lamp is adjusted via a neutral density filter.

53. A device as defined in claim 32 wherein the light output by the first lamp is adjusted by changing an orientation or position of the first lamp.

54. A device as defined in claim 32 wherein the output of the second lamp is adjusted via a mesh screen.

55. A device as defined in claim 32 wherein the output of the second lamp is adjusted via a neutral density filter.

56. A device as defined in claim 32 wherein the output of the second lamp is adjusted by changing an orientation or position of the second lamp.

57. A device as defined in claim 32 further comprising a display for viewing the images obtained by the capturing means and a programmable display lookup table for making image intensity variation appear more prominent on the display.

58. A device as defined in claim 32 wherein the first image is a green image.

59. A device as defined in claim 32 wherein a third image and a fourth image captured by the capturing means in the visible region are checked for unevenness to detect a need for correcting spectral output of the second lamp, and wherein the first image is a green image, the third image is a red image, and the fourth image is a blue image.

60. A device as defined in claim 32 wherein the first lamp comprises a set of lamps.

61. A device as defined in claim 32 wherein the second lamp comprises a set of lamps.

62. A device as defined in claim 32 wherein the second lamp generates light in the visible and the infrared regions of the spectrum.

63. A method of providing a substantially uniform lighting condition as perceived by a color sensing device for a control system in a printing press, comprising the steps of:

providing first and second lamps, the first lamp producing light in at least a visible region of a light spectrum and the second lamp producing light in only an infrared region of the light spectrum;

providing a camera for viewing images on at least two channels, at least one of the channels being in the infrared region and at least one of the channels being in the visible region;

providing a calibration target;

viewing a first image of the calibration target in a visible region of the light spectrum with the camera;

reducing unevenness in the first image by adjusting the first lamp;

viewing a second image of the calibration target in the infrared region of the light spectrum with the camera; and reducing unevenness in the second image by adjusting the second lamp.

64. A method as defined in claim 63 further comprising the step of viewing third and fourth images of the calibration target in the visible region of the camera for unevenness to check the spectral output of the first lamp, wherein the first image is a green image, the third image is a red image, and the fourth image is a blue image.

65. A method as defined in claim 63 further comprising the steps of:

capturing multiple images of the calibration target on each channel of the camera;

developing an averaged image for each of the channels by averaging corresponding pixels in the multiple images captured on each channel;

identifying a highest pixel value in each of the averaged images;

developing an intermediate compensation image for each channel by dividing the highest pixel value captured for each channel by every pixel in the averaged image of the corresponding channel;

capturing a channel image to be processed on each channel of the camera; and multiplying pixels in each of the channel images to be processed with corresponding pixels in the intermediate compensation image for the corresponding channel.

66. A method as defined in claim 63 further comprising the steps of:

providing a gray scale calibration target having a plurality of steps with different darkness characteristics;

measuring light reflectance for the plurality of steps on each channel of the camera;

calculating an average light reflectance over the bandwidth of each camera channel for each step in the plurality;

determining desired camera values for the plurality of steps in the gray scale calibration target;

adjusting the camera such that a measured camera value obtained from a lightest step on the gray scale calibration target is substantially equal to the desired camera value for the lightest step on the gray scale calibration target; and mapping the measured camera values to the desired camera values for the plurality of steps in the gray scale calibration target for each channel of the camera.

67. A method of providing a substantially uniform lighting condition as perceived by a color sensing device for a control system in a printing press, comprising the steps of:

providing first and second lamps, the first lamp producing light in only a visible region of a light spectrum, the second lamp producing light in at least an infrared region of the light spectrum;

providing a camera for viewing images on at least two channels, at least one of the channels being in the infrared region and at least one of the channels being in the visible region;

providing a calibration target;

viewing a first image of the calibration target in a visible region of the light spectrum with the camera;

reducing unevenness in the first image by adjusting the first lamp;

viewing a second image of the calibration target in the infrared region of the light spectrum with the camera; and reducing unevenness in the second image by adjusting the second lamp.

68. A method as defined in claim 67 further comprising the step of viewing third and fourth images of the calibration target in the visible region of the camera for unevenness to check the spectral output of the second lamp, wherein the first image is a green image, the third image is a red image, and the fourth image is a blue image.

69. A method as defined in claim 67 further comprising the steps of:

capturing multiple images of the calibration target on each channel of the camera;

developing an averaged image for each of the channels by averaging corresponding pixels in the multiple images captured on each channel;

identifying a highest pixel value in each of the averaged images;

developing an intermediate compensation image for each channel by dividing the highest pixel value captured on each channel by every pixel in the averaged image of the corresponding channel;

capturing a channel image to be processed on each channel of the camera; and multiplying pixels in each of the channel images to be processed with corresponding pixels in the intermediate compensation image for the corresponding channel.

70. A method as defined in claim 67 further comprising the steps of:

providing a gray scale calibration target having a plurality of steps with different darkness characteristics;

measuring light reflectance for the plurality of steps on each channel of the camera;

calculating an average light reflectance over the bandwidth of each camera channel for each step in the plurality;

determining desired camera values for the plurality of steps in the gray scale calibration target;

adjusting the camera such that a measured camera value obtained from a lightest step on the gray scale calibration target is substantially equal to the desired camera value for the lightest step on the gray scale calibration target; and mapping the measured camera values to the desired camera values for the plurality of steps in the gray scale calibration target for each channel of the camera.

* * * * *